United States Patent [19]

Molock et al.

[11] Patent Number: 5,039,769

[45] Date of Patent: Aug. 13, 1991

[54] WETTABLE, FLEXIBLE, OXYGEN PERMEABLE, SUBSTANTIALLY NON-SWELLABLE CONTACT LENS CONTAINING POLYOXYALKYLENE BACKBONE UNITS, AND USE THEREOF

[75] Inventors: Frank Molock, Lawrenceville; Kai C. Su, Alpharetta, both of Ga.

[73] Assignee: Ciba-Geigy Coproation, Ardsley, N.Y.

[21] Appl. No.: 420,680

[22] Filed: Oct. 11, 1989

[51] Int. Cl.$^5$ ................ C08F 26/02; C08L 71/02; G01B 1/04

[52] U.S. Cl. .................... 526/301; 525/404; 525/455; 523/106; 351/160 H

[58] Field of Search ............ 523/106; 526/301; 525/404, 455; 351/160 H

[56] References Cited

U.S. PATENT DOCUMENTS

| | | | |
|---|---|---|---|
| 4,192,827 | 3/1980 | Mueller et al. | 525/123 |
| 4,780,488 | 10/1988 | Su et al. | 523/106 |
| 4,857,606 | 8/1989 | Su et al. | 525/455 |
| 4,859,780 | 8/1989 | Molock et al. | 546/243 |
| 4,921,956 | 5/1990 | Molock et al. | 544/165 |

*Primary Examiner*—Allan M. Lieberman
*Attorney, Agent, or Firm*—Luther A. R. Hall; Irving M. Fishman

[57] ABSTRACT

Contact lenses which are optically clear, wettable, flexible, of high oxygen permeability and substantially non-swellable in the aqueous ocular environment of use, of a polymer containing polyoxyalkylene backbone units are disclosed, as well as the preparation thereof and methods of treating vision defects therewith.

28 Claims, No Drawings

WETTABLE, FLEXIBLE, OXYGEN PERMEABLE, SUBSTANTIALLY NON-SWELLABLE CONTACT LENS CONTAINING POLYOXYALKYLENE BACKBONE UNITS, AND USE THEREOF

This is a continuation of application Ser. No. 315,226, filed on Feb. 23, 1989, now abandoned, which in turn is a continuation of application Ser. No. 160,967, filed on Feb. 26, 1988, now abandoned.

BACKGROUND OF THE INVENTION

1. Field of the Invention

This invention relates to ophthalmic devices, such as contact lenses and intraocular implants, and particularly contact lenses of a polymer containing a backbone containing polyoxyalkylene units possessing a unique blend of properties including a) high oxygen permeability, b) good wettability, c) flexibility, d) and optical clarity in the ocular environment of use.

2. Background of the Invention

The use of optical contact lenses for the correction of vision defects or for cosmetic purposes is well known. However existing contact lenses have been found to be unacceptable to many potential contact lens patients for a variety of reasons. For example, early contact lenses were made from polymethyl methacrylate (PMMA). While PMMA lenses have high optical clarity and good durability, they are rigid lenses possessing low oxygen permeability. Consequently, PMMA lenses may result in eye irritation and corneal oxygen deprivation leading to wearer intolerance and limiting the usefulness of such lenses.

In an attempt to avoid these problems, so-called "soft" lenses, capable of swelling in an aqueous environment, were developed. These "soft" or hydrogel lenses, characteristically made from poly (2-hydroxyethyl methacrylate), poly (vinyl alcohol) or poly (vinylpyrrolidone) generally result in less irritation and intolerance than PMMA lenses for most patients. When substantial amounts of water are absorbed into the hydrogel, the oxygen permeability is increased over that of PMMA lenses, and the flexibility of such hydrogel lenses is high, thereby increasing patient comfort. However, the oxygen permeability of such hydrogel lenses is generally still rather low, and the durability is poor. Moreover, due to the high water content of such lenses, they generally have a tendency to collect and trap proteinaceous and other tear fluid materials, resulting in lens clouding over a period of time.

In another attempt to solve problems associated with early lenses, silicone, or siloxane, rubber lenses were developed. They are advantageous in that they possess high oxygen permeability and an aesthetically appealing texture when worn. However, due evidently to the generally low thermal conductivity of silicone rubber, burning sensations in wearers of silicone rubber lenses have been reported. Also, as silicone lenses tend to be lipophilic, such lenses may tighten onto the cornea, trapping debris between the lens and cornea, thereby resulting in corneal abrasions. Also, due to the characteristic lipophilic nature of such lenses, the silicone rubber is mucophilic and non-wettable, attracting ocular debris such as proteins, lipids, mucoids and the like.

It is an object of the present invention to overcome these and other disadvantages of the art by providing substantially siloxane free, wettable, oxygen permeable, swellable, ophthalmic devices, such as contact lenses and corneal implants, of a polymer containing polyoxyalkylene backbone units and optionally having hydrophilic modifier units.

A further object of the invention is to provide a method of correcting visual defects in the form of refractive errors by fitting to the patient's eye in need of the same, a corrective contact lens of such polymer.

These and other objects of the invention are apparent from the following detailed description of the invention.

DETAILED DESCRIPTION

One embodiment of the present invention relates to an optically clear, hydrolytically stable, biologically inert, wettable and flexible, substantially siloxane free, swellable, oxygen permeable ophthalmic device, such as a contact lens, fabricated from a polymer containing segments of the formula $$[[CR_1R_2-(CR_3R_4)_b-CR_5R_6-O]_x-[CR_7R_8-(CR_9R_{10})_d-CR_{11}R_{12}-O]_y-[CR_{13}R_{14}-(CR_{15}R_{16})_f-CR_{17}R_{18}-O]_z]_q \quad (I)$$

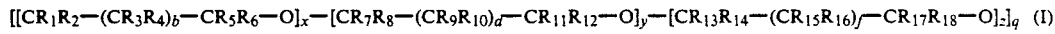

wherein each b, d and f are independently 0–4; q is a number from 1 to 1000; each x, y and z is independently 0 to a number such that $(x+y+z)$ multiplied by $q=4$ to 1000; each of $R_1$, $R_2$, $R_5$–$R_8$, $R_{11}$–$R_{14}$, $R_{17}$ and $R_{18}$ is independently selected from the group H, aliphatic, aromatic or heterocyclic containing radical such as: unsubstituted $C_1$–$C_{16}$ alkyl; substituted $C_1$–$C_{16}$ alkyl; unsubstituted $C_2$–$C_{16}$ alkenyl; and substituted $C_2$–$C_{16}$ alkenyl; wherein the alkyl and alkenyl substituents are independently selected from formyloxy carbonyl, ($C_2$–$C_{16}$ alkoxy)carbonyl, ($C_2$–$C_{16}$ alkenyloxy)carbonyl, fluoro, aryl of up to 10 carbon atoms, $C_1$–$C_8$ alkoxy, ($C_2$–$C_6$ alkanoyl)oxy, aryloxy of up to 10 carbon atoms, $C_3$–$C_6$ alkenoyloxy, aroyloxy of up to 11 carbon atoms, $C_3$–$C_8$ cycloalkyl, $C_3$–$C_8$ cycloalkyloxy, $C_3$–$C_8$ cycloalkyl-carbonyloxy, $C_3$–$C_8$ cycloalkoxy-carbonyl, oxacyloalkyl of up to 7 carbon atoms, oxacycloalkoxy of up to 7 carbon atoms, oxacycloalkoxy (up to 7 carbon atoms)-carbonyl, oxacycloalkyl (up to 7 carbon atoms)-carbonyloxy, and aryl (of up to 10 carbon atoms)-oxycarbonyl, each of said alkyl and alkenyl substituents being, in turn, optionally substituted by $C_1$–$C_6$ alkyl, fluoro or a $C_1$–$C_6$ alkoxy provided said last mentioned alkoxy is not bound to a carbon atom already bound to another oxygen atom; $R_1$, $R_2$, $R_5$–$R_8$, $R_{11}$–$R_{14}$, $R_{17}$ and $R_{18}$ being further independently selected from aryl of up to 10 carbon atoms, $C_3$–$C_8$ cycloalkyl, and oxacycloalkyl of up to 7 carbon atoms, each of which may be unsubstituted or further substituted with a substituent selected from the group of substituents for said alkyl set forth above; $R_3$, $R_4$, $R_9$, $R_{10}$, $R_{15}$ and $R_{16}$ are selected from the same group set forth above for $R_1$; and $R_3$, $R_4$, $R_9$, $R_{10}$, $R_{15}$ and $R_{16}$ are further independently selected from ($C_1$–$C_{15}$ alkoxy)carbonyl, $C_2$–$C_{16}$ alkanoyloxy, ($C_2$–$C_{16}$ alkenoxy)carbonyl, and $C_3$–$C_{16}$ alkenoyloxy, each of which may be further substituted by fluoro, aryl of up to 10 carbon atoms, or $C_1$–$C_{16}$ alkoxy, and $R_3$, $R_4$, $R_9$, $R_{10}$, $R_{15}$ and $R_{16}$ are still further independently selected from aryloxy of up to 10 carbon atoms, cycloalkoxy of up to 8 carbon atoms, cycloalkyl (of up to 8 carbon atoms)-carbonyloxy, cycloalkoxy (of up to 8 carbon atoms)-carbonyloxy, aroyloxy of up to 11 carbon atoms, oxacycloalkoxy of up to 7 carbon atoms, oxacycloalkenoxy of up to 7 carbon atoms, oxacycloalkoxy (of up to 7 carbon atoms)-carbonyloxy, oxacycloalkyl (of up to 7 carbon atoms)-carbonyloxy, oxacycloalkenyloxy (of up to 7 carbon atoms)-carbonyloxy and aryloxy (of up to 10 carbon atoms)-carbonyloxy, each of which may be further substituted by fluoro, $C_1$-$C_6$ alkyl or $C_1$-$C_6$ alkoxy, provided that any substituent having an oxygen atom or carbonyl group thereof as its link to the rest of the molecule may not be a substituent on the same carbon atom which is singly bonded to another oxygen atom. In addition, 2 adjacent $R_1$ to $R_{18}$ groups, together with the atoms to which they are attached, may form a 5-8 membered cycloalkyl, oxacycloalkyl or bicycloalkyl ring. When each of b, d, and f is 0, at least one of $R_1$, $R_2$, $R_5$-$R_8$, $R_{11}$-$R_{14}$, $R_{17}$ and $R_{18}$ in at least a portion of the segments having formula I is other than hydrogen and such group $R_1$, $R_2$, $R_5$-$R_8$, $R_{11}$-$R_{14}$, $R_{17}$ and $R_{18}$ individually or in the aggregate is sufficiently hydrophobic such that the resulting polymer is, in the absence of a hydrophilic modifier, substantially non-swellable in water, or, in the alternative, these $R_1$ to $R_{18}$ groups need not be hydrophobic at all, in which case, the polymer even without the hydrophilic modifier can frequently meet the limitations of the present invention. In either case, the polymer is sufficiently hydrophilic that it exhibits a receding contact angle with distilled water at 20° C. of less than 50°, preferably less than 40°, more preferably less than 25°, even more preferably less than 15°, most preferably less than 10°.

The instant polymers, when in aqueous substantially isotonic saline have a fully swollen water content of at least 10%, preferably 15-90%, more preferably 20-85%, still more preferably 25-75%, yet more preferably 35-55% water.

In the foregoing, unless specifically designated otherwise, all alkyl groups whether mentioned alone or as part of another group are, and preferably even those designated otherwise are $C_1$-$C_4$ alkyl, such as methyl, ethyl, propyl and butyl, especially t-butyl, with the exception that adjacent groups on aryl rings cannot each be t-butyl. These alkyl groups may be straight chain or branched chain. When the alkyl is a substituent on a phenyl ring, it is preferably attached at the para position. Unless specifically stated otherwise alkenyl groups, whether alone or as part of another group are, and preferably even those designated otherwise are, $C_2$-$C_4$ alkenyl, such as ethenyl, propenyl, or butenyl. Preferred aryl groups (whether alone or as part of another group) are phenyl or naphthyl, more preferably phenyl. Preferably, the aryl groups are still further substituted by $C_1$-$C_4$ alkyl, more preferably t-butyl, most preferably in the para position.

Preferably b, d and f are independently 0-3, most preferably 1-2. A further preferred embodiment is that the group identified by formula I be at least 20% halogen free, preferably 25%, more preferably 30%, still more preferably 40%, even more preferably substantially halogen free and most preferably, totally halogen free. Wherever cyclo groups are indicated, whether carbocyclic or heterocyclic they preferably have 5-6 ring members and the heterocyclics preferably have only carbon and one oxygen atom as a ring member.

In formula I, when b is greater than one, each of the multiple $R_3$ and $R_4$ groups may be the same or different; however preferably all of the $R_3$ groups are the same and all of the $R_4$ groups are the same. The same is true with respect to d, $R_9$, and $R_{10}$; and f, $R_{15}$, and $R_{16}$.

Preferably, each of b, d and f are independently an integer of 0 to 2, and most preferably zero or one.

In one aspect of the invention, each of $R_1$-$R_5$, $R_7$-$R_{11}$, and $R_{13}$-$R_{17}$ are hydrogen, and, if b, d, and f are each 0, then at least one of $R_6$, $R_{12}$ and $R_{18}$ in at least a portion of the segments of formula I is other than hydrogen. Preferably, at least one of $R_6$, $R_{12}$ and $R_{18}$ in most segments is other than hydrogen. More preferably, the majority (and most preferably all) of the segments of Formula I have at least one of $R_6$, $R_{12}$ and $R_{18}$ other than hydrogen.

Preferred substituents for $R_6$, $R_{12}$ and $R_{18}$ are alkyl of up to 16 carbon atoms; alkyl of up to 16 carbon atoms substituted by alkoxy of up to 8 carbon atoms, or fluoro; phenyl which is unsubstituted or substituted by fluoro, alkoxy of up to 6 carbon atoms or alkyl of up to 6 carbon atoms; benzyl, wherein the phenyl ring thereof is unsubstituted or substituted by fluoro, alkoxy of up to 6 carbon atoms or alkyl of up to 6 carbon atoms; cyclohexyl; or oxacycloalkyl of 4 to 5 ring carbon atoms.

A highly advantageous subembodiment relates to wettable, non-swellable ophthalmic devices, preferably contact lenses, fabricated from a polymer containing segments of the formula

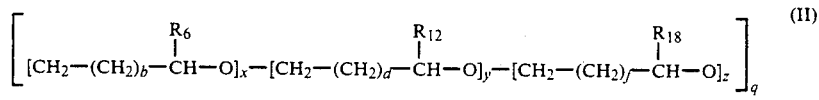

wherein b, d, f, q, x, y, z, $R_6$, $R_{12}$ and $R_{18}$ are as defined above with at least one of $R_6$, $R_{12}$ and $R_{18}$ (when present) being other than hydrogen. There are two very highly advantageous embodiments having formula II which are represented by either formula III

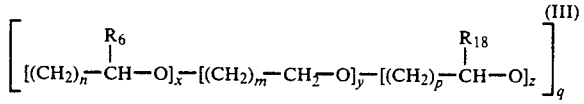

wherein n=b+1; m=d+1; p=f+1; n, m and p each independently preferably 1-3, more preferably 1-2, most preferably 1; and at least one of $R_6$ and $R_{18}$, but preferably both, is an aliphatic, aromatic, or heterocyclic radical, preferably alkyl of up to 6 carbon atoms; alkyl of up to 6 carbon atoms substituted by alkoxy of up to 6 carbon atoms or fluoro; phenyl which is unsubstituted or substituted by fluoro, alkoxy of up to 6 carbon atoms or alkyl of up to 6 carbon atoms; benzyl wherein the phenyl ring thereof is unsubstituted or substituted by fluoro, alkoxy of up to 6 carbon atoms or alkyl of up to 6 carbon atoms; cyclohexyl or oxacycloalkyl of 4 to 5 ring carbon atoms; or by formula IV

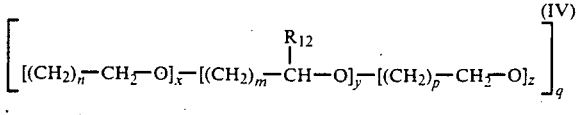

wherein n, m, p, x, y, z and q are as defined above for formula III and $R_{12}$ is preferably selected from the same group as $R_6$ in formula III.

In the foregoing it is to be understood that the units of x, y and z may be positioned randomly, in block segments, or alternately.

Another preferred embodiment corresponds to formulae II, III and IV when z is zero.

Desirably, the polymer segments of formula I or II in the completed polymer are substantially devoid of free hydroxyl groups (other than as part of a hydrophilic modifier) in the interior of the polymer.

Free hydroxy groups on the outer surfaces of the formed polymer are acceptable as they increase wettability without unduly reducing oxygen permeability. However, it is still preferable to have as few free hydroxy groups in the finished polymer as practical if a contact lens having high oxygen permeability is to be prepared. A suitable means of tying up the free hydroxy groups present would be to interact them with a color group. Typical color groups useful in these embodiments include, but are not limited to the hydroxy-reactive dyes known in the art under the tradename Remazol, manufactured by American Hoechst. Examples of the Remazol dyes which are especially suitable are:

Remazol Brill Blue RW (Color Index Code: Reactive Blue 19);

Remazol Yellow GR (Color Index Code: Reactive Yellow 15);

Remazol Black B (Color Index Code: Reactive Black 5);

Remazol Golden Orange 3GA (Color Index Code: Reactive Orange 78); and

Remazol Turquoise P (Color Index Code: Reactive Blue 21);

all of which have at least one group of the formula

which reacts with the polymer or monomer hydroxy group to yield a

or

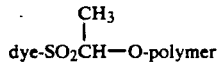

group, preferably the former. In such a manner, both excess free hydroxy groups are disposed of and colored contact lenses can be realized simultaneously. Another means of disposing of these excessive hydroxy groups is to utilize their presence to form various degrees and types of crosslinking.

In a further embodiment of the invention, the ophthalmic device, preferably a contact lens, is fabricated from a polymer consisting essentially of polymerized units of a reactive monomer of the formula $$L'-D-[A-L-D]_w-A-L''  \quad (V)$$

wherein
each A is independently a divalent moiety of formula I, provided that not all A groups in any one polymer can be homopolymers of polyethylene glycol, preferable all A groups cannot be homopolymers of polyethylene glycol or polypropylene glycol, and provided that the terminal oxygen atom within any one or more A groups may be replaced by

each L is independently selected from —BRB'B-R- or R-B'—; w is 0–8, preferably 0–4, most preferably 0, 1 or 2;

D is oxygen or —N($R_{19}$)—;

each $R_{19}$ is independently selected from H, $C_1$–$C_4$ alkyl, and phenyl, preferably H;

each B and B' being selected from

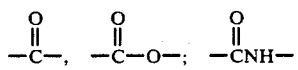

with the carbonyl group being bound to A or D;

each R is a divalent linking group preferably selected from
 i) a divalent aliphatic group preferably alkyl, alkenyl, or alkynyl, of up to 25 carbon atoms which may be interrupted by oxy, carbonyloxy, amino, aminocarbonyl, oxycarbonyl, ureido, oxycarbonylamino, or carbonylamino;
 ii) a divalent 5–7 membered cycloaliphatic and a 5–7 membered cycloaliphatic-$C_5$–$C_{25}$ aliphatic;
 iii) a divalent arylene group have 6–25, preferably 7–15 carbon atoms; and
 iv) a divalent aralkyl or alkaryl having 7 to 25 preferably 8–16 carbon atoms;

wherein groups ii) and iv) can be optionally interrupted by the same interrupting groups as in group i) and wherein the aryl rings in groups iii) and iv) may be further substituted with one or more substituents selected from halogen, preferably fluorine or chlorine, $C_1$–$C_4$ alkyl, preferably methyl, and $C_1$–$C_{12}$ perhalo alkyl, especially $C_1$–$C_{12}$ perfluoro alkyl;

L' is selected from H, P'-B-R-B'—, and P'-R-B'— wherein B, R, and B' are as defined above with the carbonyl group of B being bound to P', and P' is H, $NH_2$, OH, or a moiety containing a crosslinkable group which may be crosslinked when coreacted with a suitable crosslinking agent or when irradiated by actinic radiation; and L'' is selected from H; L''' as defined hereinafter, —B-R-B'-P', and B-R-P', wherein B, R, B' and P' are as defined above except that the carbonyl of B' instead of B is bound to P'; and L''' is a terminal monovalent aliphatic, aromatic, or cycloaliphatic group of up to 14 carbon atoms.

Compounds of formula V are modified by reacting them with a coreactive hydrophilic modifier. The hydrophilic modifier can be introduced by being coreactive with a functional group present in one or more of $R_1$–$R_{18}$ and/or with a functional group within L' and/or L''. When the hydrophilic modifier is monofunctionally reactive (other than a vinylic unsaturation), it merely modifies the polymer properties and terminates the chain at that point. When the hydrophilic modifier is di or poly reactive, i.e. contains more than one coreactive functional group or at least one coreactive vinylic group, the modifier can also act as a copolymerizable monomer and/or crosslinking agent. However, the modifier need not be the only crosslinking agent, nor need it be the only copolymerizable monomer present. When other such agents are employed any of the convention crosslinking agents and coreactive monomers may be used in minor amounts.

In any event, the polymer resulting from the polymerization of the monomer of formula V should not be crosslinked in excess of 25%, preferably not in excess of 20%, more preferably not in excess of 15%, still more preferably not in excess of 10%, even still more preferably not in excess of 5%, and most preferably in the range of 2–3%.

The purpose of the hydrophilic modifier is to maintain the water content of the resulting polymer to at least 10% when swollen in its normal environment of use. For those polymers which absent the hydrophilic modifier already meet this limit, its purpose is to increase the water content of the polymer material over that when the hydrophilic modifier is absent. However, if the polymer, without the hydrophilic modifier, is sufficiently hydrophilic, i.e. the water content is at least 10%, it need not be present, but preferably is. Whether the hydrophilic modifier is needed or not, and the amount which is needed, is dependent upon the polymer water content and other hydrophilic properties desired. Preferably, the hydrophilic modifier is present, in accordance with the above in an amount of from zero to about 25% by weight preferably about 1% to about 20%, more preferably about 5% to about 17%, still more preferably about 10% to about 15% of the resultant polymer.

In addition to the hydrophilic modifier, other comonomers which may be present in the polymer are monomers coreactive with the monomer of formula V exclusive of monomers which are hydrophilic modifiers. Such additional monomers may be present in a minor amount of up to about 20% by weight of the resultant polymer. When such comonomers are excessively hydrophobic, additional hydrophilic modifier may be incorporated so as to achieve the appropriate water content.

The hydrophilic modifier is a monomer which is coreactive with a monomer of formula V and is typically selected from N,N-dimethylarcylamide
a) polyethylene glycols of the formula

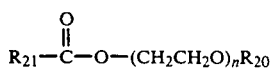

(A)

or b) pyrrolidones of the formula

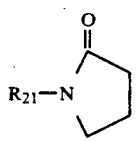

(B)

wherein $R_{20}$ hydrogen or $C_1$–$C_7$ alkyl, preferably $C_1$–$C_4$ alkyl, n is an integer of from 1–25
or c) of the formula $(R_{21}-\delta)_{z'} H'$      (C)

wherein $R_{21}$ is a polymerizable or reactive moiety selected from i) ethylenically unsaturated radicals, preferably vinyl, 1-methylvinyl, 2-methylvinyl, or allyl, ii) epoxy groups, especially glycidyl, iii) anhydrides, iv) isocyanates or isothiocyanates v) amines, vi) acids, vii) esters, viii) amides, ix) ethers, x) acid halides, and xi) hydroxy; is selected from
i) a divalent aliphatic group of up to 25 carbon atoms, preferably alkyl, alkenyl or alkynyl, which may also be interrupted, or terminated, or interrupted and terminated by oxy, carbonloxy, amino, aminocarbonyl, oxycarbonyl, ureido, oxycarbonylamino, or carbonylamino;
ii) a divalent 5–7 membered cycloaliphatic an 5–7 membered cycloaliphatic-$C_1$–$C_{20}$-aliphatic which may also be interrupted, terminated, or interruted and terminated as in group i) above except that said interruptions cannot occur within said cycloaliphatic portions;
iii) a divalent arylene having 6–25 carbon atoms which is unsubstituted or substituted by at least one substituent selected from halogen, $C_1$–$C_4$ alkyl, and $C_1$–$C_{12}$ perhaloalkyl;
iv) a divalent aralkyl or alkaryl having 7–25 carbon atoms which is uninterrupted or interrupted in the alkyl portion, or terminated, or interrupted in the alkyl portion and terminated with an interrupting or terminating group as mentioned in i) above, and each of said uninterrupted, interrupted, and terminated aralkyl and alkaryl groups is further unsubstituted or substituted by a substituent selected from halogen, $C_1$–4 alkyl, and $C_1$–12 perhaloalkyl;

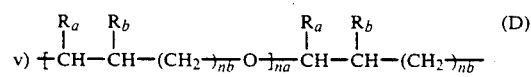

(D)

wherein
a) $R_a$ is hydrogen, $R_b$ is methyl, and nb is zero;
b) $R_a$ is methyl, $R_b$ is hydrogen, and nb is zero;
or c) $R_a$ and $R_b$ are hydrogen and nb is 1; and na is an integer of 8–100;
$z'$ is an integer of 1 up to the valence of $H'$ and where $z'$ is less than the valence of $H'$, the remaining valences are taken up with hydrogens; and $H'$ is a hydrophilic group selected from
i) morpholino; cyclic amide radicals of 5–7 ring members; saturated and unsaturated cyclic N,N-diamide radicals of 5–6 ring members; groups of the formula

(E)

wherein nc and nd are selected from 0–2 and having 6–7 ring members; and cyclic amines of 5–6 ring members; each unsubstituted or substituted by hydroxy-$C_{1-5}$ alkyl, carboxy, or lower alkyl;
ii) tetrahydrofurfuryl;
iii) mono, di, and poly saccharide radicals, whether straight chain or cyclic, their coresponding sugar alcohol radicals, pentaerythritol radicals, and polyvinyl alcohol radicals; and
iv) poly hydroxy $C_2$–$C_7$ alkyl radicals; and said reactive group $R_{21}$ is capable of reacting with one or more sites in said formula V.

Preferably the hydrophilic modifier has $R_{21}$ selected from a) 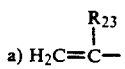

and the terminus of δ to which it is bound is —C(O)R$_{24}$—, the carbonyl being bound to R$_{21}$, where R$_{23}$ is H or methyl and R$_{24}$ is —O—, or —NR$_{25}$— with R$_{25}$ being H or lower alkyl;

b) H$_2$C=CH— and the terminus of δ to which it is bound is

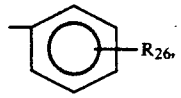

the left hand bond being bound to R$_{21}$, wherein R$_{26}$ is —O—, —NR$_{25}$—, —C(O)—, —NHCOO-lower alkylene,

or —C(O)O—; and c) 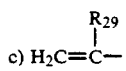

and the terminus of δ to which it is bound is —COR$_{28}$—, the carbonyl being bound to R$_{21}$ wherein R$_{21}$ is lower alkylene or —[CH$_2$CH(loweralkyl)-O]—$_{1-5}$ and R$_{29}$ is hydrogen, lower alkyl, or —CN; and H' is selected from a) morpholino which is unsubstituted or mono-tetra substituted by lower alkyl, preferably methyl or ethyl;

b) 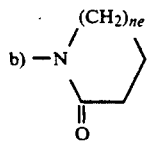

where ne is one, two, or three, preferably 1, each of which is unsubstituted or substituted, preferably mono or di substituted, by lower alkyl, preferably methyl or ethyl;

(c) 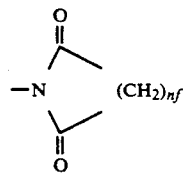

where nf is 2 or 3, preferably 2, each of which is unsubstituted or substituted by lower alkyl, preferably methyl or ethyl;

a divalent group of the formula (d)

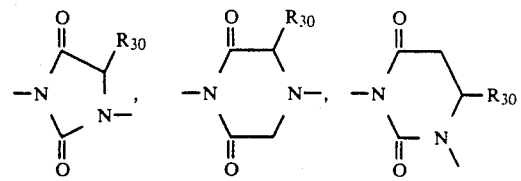

or

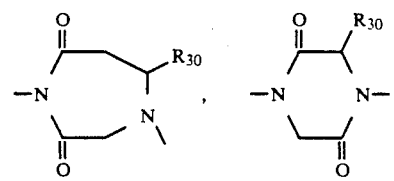

wherein R$_{30}$ is H or —COOH;

(e)

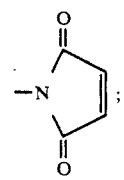

(f)

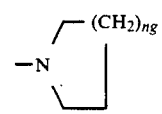

where ng is one or two, each of which is unsubstituted or substituted by lower alkyl, preferably methyl or ethyl;

(g)

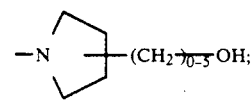

h) a polyol selected from polyvinyl alcohol radicals,

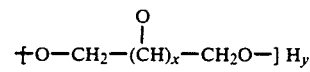

wherein x is 2–10, preferably 3–4, and y is an integer from at least 0.5x up to x+1 inclusive, preferably x−2 to x+1, the cyclic saccharide analogs thereof, the di-tetra saccharides thereof, preferably having saccharide-saccharide links between the 1 and 4 carbon positions thereof, preferably β linkages, C(CH$_2$O)$_4$ H$_{ya}$ wherein ya is 0–3, and poly hydroxy lower alkylene glycol radicals wherein up to 50%, preferably up to 25%, more preferably up to 10%, of the hydroxy groups are missing their alcoholic hydrogens.

Most preferably the hydrophilic modifier of formula C is selected from

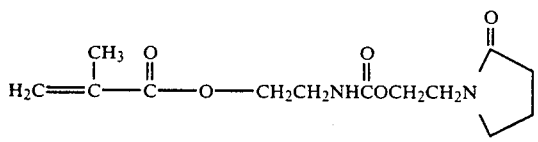

(a)

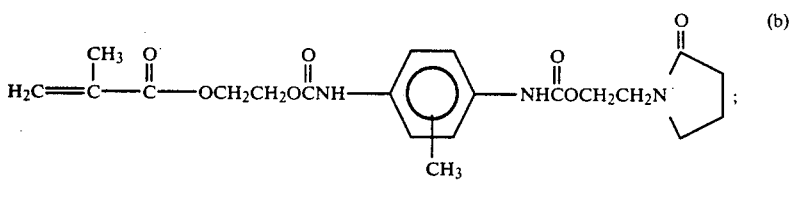

(b)

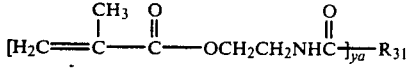 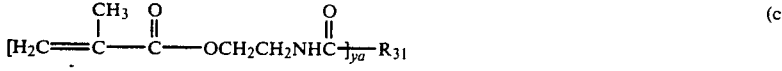

(c)

wherein $R_{31}$ is $-[OCH_2(CH)_{xa}CH_2O]-H_{yb}$ in which xa is 1–6 preferably 3–4 and yb is O up to (xa+1), preferably (xa−1) to (xa+1), more preferably xa to (xa+1), and ya is 1 up to (xa+2−yb)

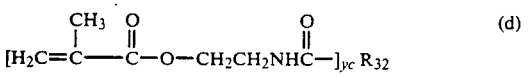

(d)

and $R_{32}$ is $C(CH_2O)_4H_{4-yc}$ wherein yc is 1–4, preferably 1–2;

e) polyvinyl alcohol having at least one and up to 50% preferably 25%, more preferably 10%, inclusive, of the alcoholic hydrogens thereof absent;

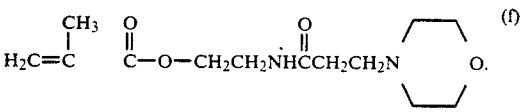

(f)

Preferably, when P' is a vinyl containing group or one or more of the aforementioned R groups contain an ethylenically unsaturated group, for example preferably

with one of $R_a$ and $R_b$, being methyl or hydrogen and the other being hydrogen, then the monomer of formula V can be crosslinked in the presence of a vinylic group containing hydrophilic modifier and/or vinylic group containing crosslinking agents.

When P' does not have a vinylic group, but takes part in crosslinking, P' contains an active hydrogen. In such cases, P' preferably terminates in a OH, $NHR_c$ ($R_c$ being H or lower alkyl), a leaving group bound directly to the B or B' carbonyl, a conventional acyl leaving group when not so bound, SCN— or OCN—. Crosslinking is then typically carried out by condensation or addition with a di or polyfunctional coreactive monomer which may or may not be a hydrophilic modifier. In such cases hydrophilicity is increased by utilizing coreactive monomers of Formulae A or B except that $R_1$ is trifunctional or polyfnctional with those functional groups coreactive with P'. For example, when P' is OH, then the coreactive monomer functional group can be $-NHR_c$, —COOH, OCN, SCN, etc.; when P' is $NHR_c$, the reactive comonomer functional group can be a conventional acyl, or acyl bound to a conventional leaving group; and when P' has OCN— or SCN—, then the reactive comonomer functional group can be OH. Similarly, the other coreactive functional groups mentioned in terms of either P' or the coreactive monomer can be interchanged. Those mentioned as part of P' being on the coreactive monomer and those mentioned as part of the coreactive monomer being part of P'.

Suitable vinylic monomers and coreactive monomers for condensation are set forth below. However, the list is not exhaustive and those of ordinary skill will appreciate the modifications, additions, and alternatives which may also be employed.

When either or both L' and L" are H, or terminate in P' with P' being H, at least one additional crosslinkable moiety must be present as one of, or a substituent on one of the groups $R_1$-$R_{18}$. Such crosslinkable groups may also be present as a substituent on or in place of one or more of $R_1$-$R_{18}$ even when both L' and L" have crosslinkable groups therein.

In a preferred embodiment, A is the divalent moiety according to formula II, most preferably according to formula III or formula IV.

Especially preferred are polymers of the monomer according to formula V in which L' and/or L" is

(VI)

wherein $R_a$ and $R_b$ are each independently H or $CH_3$, but not simultaneously $CH_3$.

A valuable sub-embodiment of the invention relates to ophthalmic devices, preferably contact lenses, of polymers consisting essentially of polymerized units of the formula

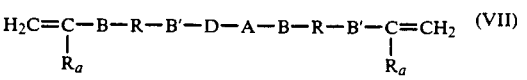

(VII)

wherein $R_a$, B, R, B' and A are as defined above, each Ra being independent of the other. Particularly preferred are polymers of the monomers of formula VI and VII wherein R is a divalent arylene group of 6 to 14 carbon atoms, or is a divalent $C_2$-$C_6$ alkylene-oxycarbonyl-$C_6$-$C_{10}$-arylene group; D is —O—; and B and B' are each —NHCO— wherein the nitrogens thereof are directly bonded to R.

A very highly preferred embodiment are those polymers from monomers of formula V and VII wherein A is of the formula

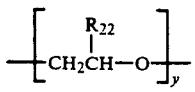

where $R_{22}$ is alkyl of 1 to 4 carbon atoms, most preferably methyl, and y is from about 6 to about 200, preferably from about 25 to about 100, and most preferably from about 50 to about 75.

Also highly preferred are those polymers of monomers of formula V and VII wherein A is of the formula

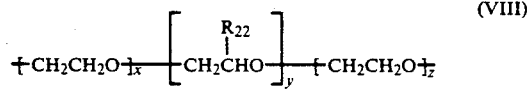 (VIII)

wherein x is between about 2 to about 20 and y is about 8 to about 100, and z about 4 to about 80. Another valuable embodiment requires the value of y to be at least about twice that of x and $R_{22}$ to be alkyl of 1 to 4 carbon atoms, preferably methyl.

The above reactive vinylic monomers are characteristically polymerized under conventional polymerization conditions. In those vinylic monomers containing but one reactive, preferably vinyl, group, a minor amount e.g. from about 0.01 to about 5 weight percent, based on the monomer of formula V, of a conventional crosslinking agent, may be employed. Suitable crosslinking agents include diolefinic monomers such as:

Allyl acrylate and methacrylate; alkylene glycol and polyalkylene glycol di-acrylates and—methacrylates, such as ethyleneglycol dimethacrylate, diethylene glycol dimethacrylate, and propylene glycol dimethacrylate; trimethylol propane triacrylate; pentaerythritol tetracrylate, divinylbenzene; divinyl ether; divinyl sulfone;

bisphenol A diacrylate or methacrylate; methylene bisacrylamide; diallyl phthalate; triallyl melamine and hexamethylene di-acrylate and—methacrylate. Also, such minor amounts of a crosslinking agent may be employed, if desired, in the polymerization of the divinyl monomer of formula V and VII.

When the monomers of formula V have free hydroxy, isocyanato, carboxylic acid, or amine groups, suitable crosslinking agents contain di or poly functional co-reactive groups to form addition or condensation reactions linking 2 or more chains.

If desired, the monomer reaction mixture may contain a catalytic amount of a conventional catalyst, preferably a free radical catalyst. Of particular interest are conventional peroxide and azo catalysts, such as hydrogen peroxide, benzoyl peroxide, tert-butyl peroctoate, benzoyl perodixe or azobis(isobutyrylnitrile).

The polymerization can generally be carried out at temperatures between about 20° to about 150° C., for a period between about 1 to about 24 hours. It is understood that the time and temperature in such a reaction are inversely related. Thus, temperatures employed in the upper end of the temperature range will generally provide reaction times near the lower end of the time range. Preferrably, the polymerization is conducted in the presence of actinic radiation, such as UV light.

Depending upon the nature of the polymer mixture, it may be desirable for the polymers obtained from such polymerizations to be post cured, eg. at a somewhat elevated temperature such as between about 60° C. to about 150° C.

For the preparation of contact lenses, the polymer mixture may be cast directly in the shape of the lens, or the polymerization may be carried out in a mold having a shape convenient for further processing, such as in the shape of small cylinders or "buttons", which can then be machined.

In yet a further subembodiment of the invention, the ophthalmic device, preferably a contact lens, is fabricated from a polymer consisting essentially of an addition product of

 (IX)

and a)  (X)

wherein A, L, D and w are as defined above;

t is an integer of 2 to 4;

G is an aliphatic, aromatic, araliphatic, carbocyclic or heterocyclic residue having a valency corresponding to the value of t and containing up to about 24 carbon atoms, or where t is 2, may also represent a divalent group of the formula

$Y_1$ is a divalent aliphatic group of up to 14 carbon atoms which may be interrupted by oxy, carbonyloxy, amino, aminocarbonyl, oxycarbonyl, ureido, oxycarbonylamino or carbonyl; a divalent aliphatic hydrocarbyl- carbonyl or —aminocarbonyl group of up to 14 carbon atoms and wherein the carbonyl group thereof is covalently bonded to the adjacent oxygen or $NR_{19}$ moiety; a divalent 5 to 7-membered cycloaliphatic group of from 5 to 14 carbon atoms; a divalent arylene group of 6 to 14 carbon atoms; a divalent aralkyl or alkaryl group of 7 to 14 carbon atoms; a divalent 5 to 7-membered cycloaliphatic—carbonyl or —aminocarbonyl group of from 6 to 15 carbon atoms, wherein the carbonyl groups thereof is covalently bonded to the adjacent oxygen or $NR_{19}$ moiety; or a divalent arylene-, aralkyl— or alkaryl—carbonyl or —aminocarbonyl group wherein the arylene group is of 6 to 14 carbon atoms, the aralkyl or alkaryl group is of 7 to 14 carbon atoms, and the carbonyl group is covalently bonded to the adjacent oxygen or $NR_{19}$ moiety; or $Y_1$ is a direct bond where E is hydrogen;

E is hydrogen, hydroxy or amino when $E^1$ and/or $R_{21}$ is isocyanato or isothiocyanato; and E is isocyanato or isothiocyanato when $E^1$ and/or $R_{21}$ is hydroxy or amino; or b) a hydrophilic modifier of formula C or c) a mixture of a) and b).

Advantageously, in order to insure adequate crosslinking, in one subembodiment there is employed at least a minor amount of those compounds wherein t is 3, for example at about 0.2% by weight based upon the amount of compound of formula VI employed. Generally, a stoichiometrically equivalent amount of the compounds of IX and X are combined; however a slight excess of di- or polyisocyanate or isothiocyanate may be employed to insure sufficient crosslinking to maintain dimensional stability in the product. As a further alternative, additional conventional crosslinking agents may be employed to insure sufficient crosslinking such that the product maintains dimensional stability. Thus, in addition to the compounds of formula IX and X and C, there may also be added to the reaction mixture a minor amount, e.g. up to about 5 weight percent, of a conventional di-isocyanate or tri-isocyanate such a toluene di-isocyanate, isophorone di-isocyanate, 4,4'-methylenebis(phenyl isocyanate), methylenebis(cyclohexyl isocyanate), melamine tri-isocyanate, and the like. Alternatively where a stoichiometric excess of isocyanate is employed in the reaction of C, IX, and X, a minor amount, e.g. up to about 5 weight percent, of a di- or polyfunctional amine or hydroxylated crosslinking agent may be employed. Suitable such crosslinking agents include, for example ethylene glycol, glycerin, diethylene glycol, ethylene diamine, ethanolamine, triethanolamine, diethanolamine and the like.

The addition reaction between the compounds of formula C, IX, and formula X and any additional crosslinker can be conducted under conditions known, per se. Thus, the compounds may be simply admixed, in the presence of an nert diluent if necessary or desired, at a reaction temperature between about 0° C. and about 100° C., preferably between about 20° C. and 80° C., optionally in the presence of a condensation catalyst, such as triethyl amine or di-n-butyltin diacetate.

In the preparation of ophthalmic devices, such as contact lenses, the reaction mixture may be cast directly in the shape of the lens, or the polymerization may be carried out in a mold having a shape convenient for further processing, such as the shape of a small cylinder or "button", which can then be machined.

The compounds of the formula C, V, VII, IX and X are either known or can be prepared by methods which are known, per se. The compounds of formula c are more fully described in a concurrently filed U.S. patent application entitled HYDROPHILIC MODIFIER MONOMERS, invented by Frank Molock and Richard Robertson.

The vinylic monomers of formula V can be prepared by reacting either (a) a mono-ol of the formula

$$HO\text{-}(A\text{-}L\text{-}D)_w\text{-}A\text{-}L''' \quad (XI)$$

where L''' is a terminal monovalent aliphatic, aromatic or cycloaliphatic group of up to 14 carbon atoms, or (b) a diol of the formula

$$HO\text{-}(A\text{-}L\text{-}D)_w\text{-}A\text{-}H \quad (XII)$$

wherein A, L, D and w are as defined above, with a stoichiometric amount of a vinylic compound of the formula

$$H_2C=C-BR-X \quad (XIII)$$
$$\quad \; |$$
$$\quad R_a$$

wherein X is a isocyanato group; an activated carboxy group, such as an anhydride, an acid halide, or a carboxy ester; or is a leaving group, such as a halide, sulfato, or the like, at temperatures between about 0° C. to about 100° C., in the presence or absence of a conventional additional catalyst, and in the optional presence of an inert diluent, and recovering the product of formula V. Where X is a leaving group, such as a halide, the product of formula XII may be in the form of its alkoxide, such as alkali metal alkoxide, salt.

Alternatively, one may prepare products of formula V wherein B and B' are —NHCO— and D is —O— by reacting a diisocyanate, such as an aliphatic, aromatic, cycloaliphatic, or aralphatic diisocyanate with a mono-ol or diol according to formula XI or XII, respectively, and react the corresponding isocyanato terminated product with a hydroxy containing acrylate or methacylate, such as hydroxyethyl-acrylate or -methacrylate, or an allyl amine or methallyl amine or allyl or methallyl alcohol to form the corresponding product of formula V at a temperature between about 0° C. and 100° C., in the presence or absence of an inert diluent, and optionally in the presence of an addition catalyst, such as a tertiary amine, eg. triethylamine or an organo-tin compound and recovering the product of formula V.

Still further, compounds of formula XII can be reacted with compounds of the formula

$$X\text{-}R\text{-}X \quad (XIV)$$

where R and X are as defined above, to form a compound of the formula

$$X\text{-}R\text{-}B\text{-}(A\text{-}L\text{-}D)_w\text{-}A\text{-}B\text{-}R\text{-}X \quad (XV).$$

Compounds of formula XV are then reacted with an X coreactive moiety which also contains a vinyl group, for example hydroxy ethyl methacrylate to yield a compound of formula V.

The compounds of formula XI and formula XII are known or can easily be prepared by methods known per se.

For example, the compounds of formula XII can be prepared by reacting a diol of the formula HO-A-H with a difunctional reactive group containing compound having the group L wherein the reactive groups are isocyanate, activated carboxy, such as an anhydride, an acid halide or a carboxy ester, or is a leaving groups, such as halide, sulfato or the like. Where the molar ratio of diol to the difunctional reactive group containing compound is about 2 to 1, the value of w in the resulting adduct of formula XII is about 1; where about 3 moles of diol are reacted with about 2 moles of the difunctional group containing compound, the resulting average value of w in the adduct of formula XII is characteristically about 2, and so on. The aforementioned reaction to obtain those compounds of formula XII where w is 1 or greater, can be conducted at a reaction temperature between about −10° C. to about 100° C. depending on the relative reactivities of the species involved, in the presence or absence of an inert diluent and in the optional presence of an addition catalyst, if desired or appropriate.

Suitable polyols and amino polyethers of the formula HD-A-H wherein A represents the divalent moiety of formula I are generally known materials or can be prepared by methods known, per se.

Thus, the polyols of the formula HO-A-H are generally prepared by the addition reaction of xq moles of an epoxide of the formula

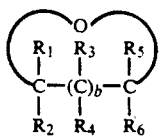

(XVI)

where $R_1$–$R_6$, b, x, and q are as defined above, with yq moles of an epoxide of the formula

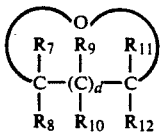

(XVII)

where $R_7$–$R_{12}$, d, y, and q are as defined above, and zq moles of an epoxide of the formula

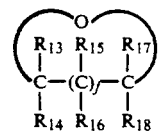

(XVIII)

wherein $R_{13}$–$R_{18}$, f, z, and q are as defined above optionally in the presence of a conventional alkylation catalyst, at atmospheric to elevated pressures of up to about 30 atmospheres gauge, at temperatures between 0° C. to about 130° C., optionally in the presence of an inert diluent. If desired, one may add to the reaction mixture, prior to the reaction of the epoxides, an aliphatic, aromatic or cycloaliphatic alcohol, acid or amine having up to 14 carbon atoms to prepare the corresponding mono-ols terminating in the group D.

The reaction between the epoxides, when mixtures of different epoxides are employed to obtain the polyol of the formula HO-A-H, can be conducted by admixing the epoxides to obtain random copolymers or terpolymers, etc., or the addition can be conducted sequentially to form block copolymers having terminal hydroxy groups. Suitable catalysts include alkaline earth oxides, alkaline earth carbonates, alkyl zinc compounds, aluminum alkoxides, hydrates of ferric chloride, bromide and acetate, and gamma radiation. The reaction may also by initiated by the presence of a glycol, such as ethylene glycol or propylene glycol or by a polyol of higher functionality such as sucrose, or by an amine, such as ethylene diamine, toluenediamine, and so forth. Generally the length of time of the reaction will depend in part on the alkylene oxide employed, but can generally be from less than one to several score hours. Thus, ethylene oxide generally is about three times as active as propylene oxide, which in turn reacts more rapidly than 1,2-butylene oxide. The preparation of polyoxitanes and polyetetrahydrofurans are generally initiated via ring opening oxonium formation using trialkyloxonium salts, carboxonium salts, acylium salts and the like.

Suitable diols of the formula HO-A-H include those prepared from epoxides such as:

1,2-propylene oxide; 1,2-butylene oxide; 1,2-epoxydecane; 1,2-epoxydodecane; 1,2-epoxyoctane; 2,3-epoxynorbornane; 1,2-epoxy-3-ethoxypropane; 1,2-epoxy-3-phenoxypropane; 2,3-epoxypropyl 4-methoxyphenyl ether; tetrahydrofuran; 1,2-epoxy-3-cyclohexyloxypropane; oxetane; 1,2-epoxy-5-hexene; 1,2-epoxyethylbenzene; 1,2-epoxy-1 methoxy-2-methylpropane; perfluorohexylethoxypropylene oxide; benzyloxypropylene oxide; and the like. Also, the aforementioned epoxides may be employed as mixtures thereof. Further, certain cyclic ethers of formula XVI, XVII and XVIII where b or d or f, respectively is 3 and the carbocyclic portion of the ring is substituted are resistant to polymerization alone, but copolymerize quite readily with more reactive cyclic ethers. Suitable co-monomers include, for example, 2-methyl-tetrahydrofuran and 3-methyl-tetrahydrofuran. Also, while ethylene oxide may be employed as a co-monomer, ethylene oxide polymers, in the absence of more hydrophobic units, is characteristically too hydrophilic and too excessively absorbs aqueous fluid to be of use in accordance with the instant invention. However, ethylene oxide/propylene oxide copolymeric diols wherein there is greater than 60% propylene oxide, on a mole basis, is sufficiently hydrophobic so as to be substantially non-swellable in aqueous media, and yet sufficiently hydrophilic so as to exhibit a contact angle with water of less than 60°; preferably less than 40°, more preferably less than 25°, more preferably less than 15°, most preferably less than 10°.

In general, the maximum amount of ethoxy units in the polymer backbone of the instant polymeric ophthalmic devices will depend upon the amount of water absorbed by such polymer under use conditions. The polymers for use according to the instant invention characteristically do not absorb more than about 10% by weight water based upon the total weight of polymer, preferably not more than about 7% by weight water, and most preferably not more than about 5% by weight water. The absorption amount of water is generally or conveniently measured at about 20° C. using distilled water or, if desired, an isotonic solution.

Many polymer diols of the formula HO-A-H are commercially available. Thus, suitable diol products include poloxamers having the general formula

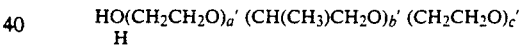

wherein b' has a value between about 16 and 70 and the sum of a' and c' is between about 4 to about 100. Examples of such poloxamers, and their average values of a', b' and c', include poloxamer 101 (a' is 2, b' is 16, c' is 2); polyoxamer 105 (a' is 11, b' is 16, c' is 11); poloxamer 108 (a' is 46, b' is 16, c' is 46); poloxamer 122 (a' is 5, b' is 21, c' is 5); poloxamer 124 (a' is 11, b' is 21, c' is 11); poloxamer 181 (a' is 3, b' is 30, c' is 3); poloxamer 182 (a' is 8, b' is 30, c' is 8); poloxamer 183 (a' is 10, b' is 30, c' is 10); poloxamer 185 (a' is 19, b' is 30, c' is 19); poloxamer 212 (a' is 8, b' is 35, c' is 8); poloxamer 231 (a' is 6, b' is 39, c' is 6); poloxamer 282 (a' is 10, b' is 47, c' is 10); poloxamer 331 (a' is 7, b' is 54, c' is 7); poloxamer 401 (a' is 6, b' is 67, c' is 6).

Such poloxamers are available, eg. from BASF Wyandotte under their Pluronic ® brand name.

Polypropylene ether glycols include commercially available products having a molecular weight range between about 400 to about 4,000. Also commercially available are polytetramethylene ether glycols of moderately low molecular weight, generally between about 1,000 and 2,000, and polymers of 1,2 butylene oxide, i.e. polybutyl ether glycol.

As stated above, the polymers for use in the instant invention are those which exhibit a receding contact angle at 20° C. of less than 60°, preferably less than 40°, more preferably less than 25°, more preferably less than 15° and most preferably less than 10°. The measurement of such contact angle is convientently performed using a modified "Wilhelmy Plate" technique, as described, for example, for J. D. Androde, et al. *Surface and Interfacial Aspects of Biomedical Polymers*, Vol. 1, *Surface Chemistry and Physics*, Plenum Press, 1985, wherein a specimen sample in the form of a plate of known dimensions is immersed into the wetting solution, pure water, at a slow controlled rate, eg. at 2-20 mm per minute. Poly(hydroxyethylmethacrylate) generally has, under these conditions, a receding contact angle of 39°-43°.

As mentioned above, the instant polymers for use in the present invention possess a high degree of oxygen permeability. The oxygen permeability, $Dk(\times 10^{-10})$, is measured using a modification of ASTM standard D3985-81 in that (a) there is used 21% oxygen, i.e. air, instead of 99-100% oxygen, (b) the surface area of sample employed is 0.50 square meters versus 100 square meters and the humidity is controlled to be at 95-100% relative humidity instead of 0% relative humidity. The unit of Dk is (cm.mm/s) (mlO$_2$/ml.mmHg).

Typically, conventional fully swollen polyhydroxyethyl methacrylate (HEMA) lenses which are sparingly crosslinked possess a $Dk(\times 10^{-10})$ (cm.mm/s) (mlO$_2$/ml.mmHg) value of about 5-7.

The oxygen permeability of the instant polymers for use as an ophthalmic device, such as a contact lens, advantageously possess a $Dk(\times 10^{-10})$ value generally greater than 1-1.5 times that of HEMA, preferably greater than about 2.5 times that of HEMA, more preferably greater than about 3 times that of HEMA and most preferably greater than about 40.

The following examples are for illustrative purposes and are not to be construed as limiting the invention. All parts are by weight unless otherwise specified.

All of the following Examples have procedures common to each. These common procedures are as follows:

1. All glassware is dried in an oven which is at 150° C. for at least 5-6 hours.
2. When assembled the reaction system must stay under a constant nitrogen environment.
3. All of the isocyanates used should be freshly distilled.
4. All of the polyglycol material should contain no more than 0.005% water. For these Examples all of the diols were stripped of water using a Pope wipe film still at 65° C. and less than 2 mm mercury.
5. After the reaction glassware is assembled and under a Nitrogen atmosphere the set up is flame dried for 20 minutes to ensure that all of the moisture is absent from the system.
6. All of the methylene chloride used in these reactions is distilled into molecular seives thru a 20 mm column packed with glass helices.

EXAMPLES 1-7

To a three neck round bottom flask fitted with an air cooled condensor, dropping funnel, Claisen adaptor, mechanical stirring bar, nitrogen inlet and outlet with the outlet equipped with a dessicant tube is added 250 g (0.0625 mol) of PPG 4000, 350 g of methylene chloride, and 0.45 g (0.0011 mol) of Stannous Octoate. The reactants are well stirred for forty-five minutes. To a dropping funnel is added 18.13 g (0.1250 mol) of Styrene Isocyanate and 150 g of methylene chloride. The Isocyanate mixture is added over a six to eight hour period dropwise to the diol; checking the reaction mixture occasionally for heat generated in the course of the reaction. It is imperative that the temperature of the reaction not exceed 35° C. or generally color will develop in the reaction mixture. If the temperature starts to increase the contents of the reaction mixture should be cooled by the use of an icebath. After three to four hours the completion of the reaction can be followed by IR spectroscopy by the disappearance of the hydroxyl adsorption at 3500 cm$-1$. The completion of the reaction can again be followed by IR by observing the dissappearance of the NCO adsorption at 2270 cm$-1$. After the completion of the reaction 0.40% Daracur and the hydrophilic modifier in the Table I below in the amount indicated therein is added directly to the reaction mixture. The reaction mixture is then stirred for an additional 2 hours. The prepolymer solution is transferred to a single neck flask which is then connected to a rotary evaporator so that the methylene chloride can be removed. The stripping is done at approximately 5 mm Mercury and ambient temperature for the first hour then at 30° C. for the last thirty minutes. The prepolymer is cured at 3-5 milliwatts for thirty to ninety minutes. The film produced from this prepolymer has a Dk and water content reported in the Table.

TABLE I

| | | Resulting Polymer | |
|---|---|---|---|
| Hydrophilic Modifier | % by weight | water content (%) | DK (multiples of HEMA) |
| 1. N-vinylpyrrolidone | 10 | 11.0 | 4 |
| 2. " | 15 | 16.0 | 3.5 |
| 3. " | 20 | 20.5 | 3 |
| 4. " | 30 | 31.0 | 3 |
| 5. N,N-dimethyl-acrylamide | 10 | 7-8 | 5-8 |
| 6. N,N-dimethyl-acrylamide | 15 | 9-11 | 5-6 |
| 7. reaction product styrene isocyanate with N-2-hydroxy-ethylpyrrolidone | 10 | 12.0 | 3 |

EXAMPLES 8-13

To a three neck round bottom flask fitted with an air cooled condesor, dropping funnel, Claisen adaptor, mechanical stirring bar, nitrogen inlet and outlet with the outlet equipped with a dessicant tube is added 250 g (0.0625 mol) of PPG 4000, 350 g of methylene chloride and 0.45 g (0.0011 mol) of Stannous Octoat, the reactants are well stirred for 45 minutes. To a dropping funnel is added 0.03125 mol of toluene diisocyanate and 150 g of methylene chloride. The isocyanate mixture is aded over a six-eight hour period dropwise to the glycol while maintaining the temperature below 35° C. to avoid coloration. The completion of the reaction is followed by IR spectroscopy by observing the disappearance of the NCO adsorption at 2270 cm$^{-1}$.

To a dropping 0.1250 mol of styrene isocyanate and 150 g of methylene chloride are added and the mixture added dropwise to the prior reaction product over a 6-8 hour period with cooling as needed to keep the temperature below 35° C. The reaction can be followed by IR spectroscopy by disappearance of the NCO adsorption at 2700 cm$^{-1}$ or disappearance of the hydroxyl adsorption at 3500 cm$^{-1}$. After completetion, 0.40% Darocur and the hydrophilic modifier in Table II in the amount indicated are added directly to the reaction mixture, which is then stirred for 2 hours. The solution is transferred to a single neck flask which is connected to a rotary evaporator so tha the methylene chloride can be removed at 5 mm mercury and ambient temperature for one hour and then at 30° C. for 30 minutes. Curing is carried out at 3-5 milliwats for 30-90 minutes. The resulting polymer has the DK and water content reported in Table II.

TABLE II

| Hydrophilic Modifier | % by weight | Resulting Polymer % water content | DK (multiples of HEMA) |
|---|---|---|---|
| 8. N-vinylpyrolidone | 10 | 18 | 4 |
| 9. N-vinylpyrolidone | 15 | 26 | 3 |
| 10. N-vinylpyrolidone | 20 | 35 | 2.8 |
| 11. N,N-dimethylacrylamide | 10 | | |
| 12. N,N-dimethylacrylamide | 15 | | |
| 13. reaction product of styrene isocyanate with N-2-hydroxyethyl pyrrolidone | 10 | | |

EXAMPLES 14–17

In an analogous fashion to Examples 5 and 6, Examples 14–17 are prepared using the amounts of N,N-dimethylacrylamide (DMA) shown below.

| Example | % DMA | 4000 ST % H₂O | DK (multiple of HEMA) |
|---|---|---|---|
| 5 | 10 | 7–8 | 5–8 |
| 6 | 15 | 9–11 | 5–6 |
| 14 | 20 | 15–17 | 4–5 |
| 15 | 30 | 27–30 | 4–5 |
| 16 | 40 | 40–44 | 3–4 |
| 17 | 50 | 50–55% | 3–4 |

EXAMPLES 18–20

In a similar fashion, x moles of toluene diisocyanate (TDI) are reacted with 2x moles of a dihydroxy polyether listed below. The product is then reacted with (a)2x moles of TDI and finally encapped with 2x moles of 2-hydroxy ethyl methacrylate or (b) 2x moles of styrene isocyanate. This product is then cured.

| Polyether | % Water Content | Dk (multiples of HEMA) |
|---|---|---|
| 18 Polyxomer 333 | 38 | 6 |
| 19 Poloxomer 124 | 53 | 4 |
| 20 Poloxomer 185 | 59 | 5 |

The same materials, prior to cure can be mixed with coreactive monomers, especially the hydrophilic modifiers described in U.S. Pat. Nos. 4,859,780 and 4,921,956, Richard Robertson entitled HYDROPHILIC MODIFYIER MONOMERS, all of which result in raising the Dk reported above even higher.

What is claimed is:

1. An optically clear, wettable, flexible, hydrolytically stable, biologically inert, substantially siloxane free, and oxygen permeable crosslinked polymer comprising a) units of formula I

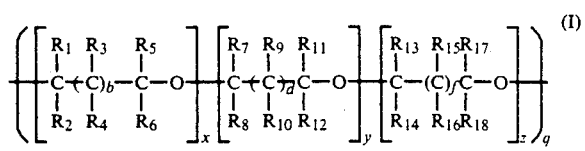

wherein each b, d, and f is independently 0–4; each q is a number of 1–1000;

each x, y, and z is independently a number from 0 to a number such that $(x+y+z)$ times q within each unit of formula I is 4–1000;

each $R_1$–$R_{18}$ is selected from the group consisting of
(i) hydrogen, and
(ii) aromatic or alicyclic containing radical, each of which uninterrupted or interrupted by a heteroatom provided no carbon atom in said unit is geminally singly-bound to oxygen atoms;

or any 2 adjacent groups $R_1$–$R_{18}$, together with the atoms to which they are attached can form a 5–8 membered ring;

or $R_1$–$R_{18}$ may independently be additionally selected from, or any of the aforementioned $R_1$–$R_{18}$ groups may have a substituent which is a cross-linkable moiety provided that no carbon atoms bearing geminally singly-bound oxygen atoms results; the terminal oxygen atom within any unit of formula I being replaceable by

wherein $R_{19}$ is hydrogen, $C_{1-4}$ alkyl or phenyl; with the proviso that when b, d, and f are all zero, at least one of $R_1$, $R_2$, $R_5$–$R_8$, $R_{11}$–$R_{14}$, $R_{17}$, and $R_{18}$ in at least a portion of the units of formula I is other than hydrogen; and further provided that $R_1$–$R_{18}$ individually, or in the aggregate, is sufficiently hydrophobic such that in the absence of a hydrophilic modifier unit, the resulting polymer is substantially non-swellable in water;

and b) a hydrophilic modifier unit in an amount sufficient to maintain the water content of said crosslinked polymer in excess of 10%;

said cross-linked polymer having a receding contact angle with distilled water of less than 60° when measured at 20° C. and an oxygen permeability Dk greater than about 1–1.5 times that of polyhydroxyethyl methacrylate said hydrophilic modifier unit being the residue of a reactive monomer selected from N,N-dimethylacrylamide, or a) polyethylene glycols of the formula

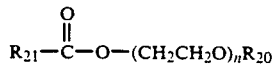 (A)

or b) pyrrolidones of the formula

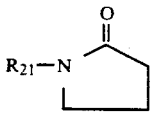

wherein $R_{20}$ is H or lower alkyl, n is 1-25, and $R_{21}$ is an ethylenically unsaturated group or c) of the formula

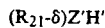
(R$_{21}$-δ)Z'H'     (C)

wherein $R_{21}$ is a polymerizable moiety selected from the group consisting of ethylenically unsaturated radicals, epoxy groups, anhydrides, isocyanates, amines, acids, esters amides, ethers, acid halides, and hydroxy; 8 is selected from i) a divalent aliphatic group of up to 25 carbon atoms which may also be interrupted or terminated, or interrupted and terminated by oxy, carbonyloxy, amino, aminocarbonyl, oxycarbonyl, ureido, oxycarbonylamino, or carbonyl amino;

ii) a divalent 5-7 membered cycloaliphatic and a 5-7 membered cycloaliphatic-C$_{1-20}$aliphatic which may also be interrupted, terminated, or interrupted and terminated as in group i) above except that said interruptions cannot occur within the cycloaliphatic portions;

iii) a divalent arylene having 6-25 carbon atoms which also is unsubstituted or substituted by at least one substituent selected from halogen, C$_{1-4}$ alkyl, and C$_{1-12}$ perhalo alkyl;

iv) a divalent aralkyl or alkaryl having 7-25 carbon atoms which is uninterrupted or interrupted in the alkyl portion, or terminated, or interrupted in the alkyl portion and terminated with an interrupting or terminating group as mentioned in i) above, and each of said uninterrupted, interrupted, and terminated aralkyl and alkaryl groups is further unsubstituted or further substituted by a substituent selected from halogen, C$_{1-4}$ alkyl, and C$_{1-12}$ perhaloalkyl; and

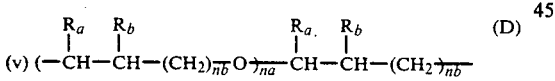

wherein na=8-100, each $R_a$ is CH$_3$ and each $R_b$ is H and nb is 0 or each $R_a$ is H and each $R_b$ is CH$_3$ and nb is zero or $R_a$ and $R_b$ are each H and nb is 1; and H' is a hydrophilic group selected from a) morpholino, cyclic amide radicals of 5-7 ring members; saturated and unsaturated cyclic N,N-diamides of 5-6 ring members,

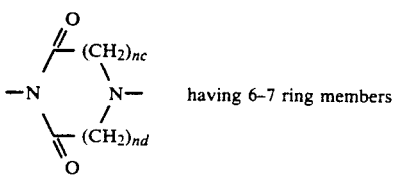
having 6-7 ring members wherein nc and nd are each selected from 0-2; cyclic amines of 5-6 members; each unsubstituted or substituted by hydroxy-C$_{1-5}$ alkyl, carboxy, or lower alkyl b) tetrahydrofurfuryl c) mono, di, and poly saccharide radicals, whether straight chain or cyclic, and the corresponding sugar alcohol radicals, pentaerythritol radicals, polyvinyl alcohol radicals, and d) (poly hydroxy C$_2$-C$_7$alkyl) radicals and Z' is 1 up to the valency of said H' and when Z' is less than the valency of H', such excess valences are taken up by hydrogen;

wherein the reactive group $R_{21}$ is capable of reacting with one or more non hydrophilic modifier sites in said polymer.

2. A crosslinked polymer of claim 1 wherein each of $R_1$, $R_2$, $R_5$-$R_8$, $R_{11}$-$R_{14}$, $R_{17}$, and $R_{18}$ is independently selected from the group consisting of C$_1$-C$_{16}$ alkyl, C$_{2-16}$ alkenyl, aryl of up to 10 carbon atoms, C$_3$-C$_8$ cycloalkyl, and oxacycloalkyl of up to 7 carbon atoms, each of which is unsubstituted or substituted, by a substituents independently selected from formyloxycarbonyl, (C$_2$-C$_{16}$ alkoxy)carbonyl, (C$_2$-C$_{16}$ alkenyloxy)carbonyl, fluoro, aryl of up to 10 carbon atoms, C$_1$-C$_8$ alkoxy, C$_2$-C$_6$ alkanoyloxy, aryloxy of up to 10 carbon atoms, C$_3$-C$_6$ alkenoyloxy, aroyloxy of up to 11 carbon atoms, C$_3$-C$_8$ cycloalkyl, C$_3$-C$_8$ cycloalkoxy, C$_3$-C$_8$ cycloalkyl-carbonyloxy, C$_3$-C$_8$ cycloalkyloxy-carbonyl, oxacycloalkyl of up to 7 carbon atoms, oxacycloalkoxy of up to 7 carbon atoms, oxacycloalkoxy (of up to 7 carbon atoms)-carbonyl, oxacycloalkoxy (of up to 7 carbon atoms)-carbonyloxy, and aryl (of up to 10 carbon atoms)-oxycarbonyl, each of said substituents being in turn unsubstituted or substituted by C$_1$-C$_6$alkyl, by fluoro, or by C$_1$-C$_6$alkoxy, provided no carbon is geminally singly-bound to oxygens; and each $R_3$, $R_4$, $R_9$, $R_{10}$, $R_{15}$, and $R_{16}$ is independently selected from a) the group set forth for $R_1$ above;

b) C$_1$-C$_{15}$ alkoxy-carbonyloxy, C$_2$-C$_{16}$ alkanoyloxy, (C$_2$-C$_{16}$ alkenoxy)carbonyl, and C$_3$-C$_{16}$ alkenoyloxy each of which is unsubstituted or further substituted by fluoro, by aryl of up to 10 carbon atoms, or C$_1$-C$_{16}$ alkoxy; and c) aryloxy of up to 10 carbon atoms, cycloalkoxy of up to 8 carbon atoms, cycloalkyl (of up to 8 carbon atoms)-carbonyloxy, cycloalkoxy (of up to 8 carbon atoms)-carbonyloxy) aroyloxy of upto 11 carbon atoms, oxacycloalkoxy of up to 7 carbon atoms, oxacycloalkenyloxy of up to 7 carbon atoms, oxacycloalkyoxy (of up to 7 carbon atoms)-carbonyloxy, oxacycloalkyl (of up to 7 carbon atoms)-carbonyloxy, oxacycloalkenyl (of up to 7 carbon atoms)-carbonyloxy, oxacycloalkenyloxy (of up to 7 carbon atoms)-carbonyloxy, and aryloxy (of up to 10 carbon atoms)-carbonyloxy, each of which is unsubstituted or further substituted by fluoro, by C$_1$-C$_{16}$ alkyl, or by C$_1$-C$_6$ alkoxy provided that no carbon atom is geminally singly-bound to oxygen atoms; and 2 adjacent $R_1$-$R_{18}$ together with the atoms to which they are attached may form a 5-8 membered mono or bi-cycloalkyl or a 5-8 membered oxacycloalkyl provided the ring oxygen in said oxacycloalkyl so formed is not bound to a carbon atom which is singly bound to a second oxygen atom; and said $R_1$-$R_{18}$ may further be selected from or have a substituent thereon selected from crosslinkable moieties provided that no carbon atoms bearing geminal singly-bound oxygen atoms result.

3. A crosslinked polymer of claim 1 which is crosslinked up to 10%.

4. A crosslinked polymer of claim 3 which is crosslinked up to 5%.

5. A crosslinked polymer of claim 4 which is crosslinked from 1-4%.

6. A crosslinked polymer of claim 5 which is crosslinked 2-3%.

7. A crosslinked polymer of claim 1 wherein said receding contact angle is less than 50°.

8. A crosslinked polymer of claim 7 wherein said receding contact angle is less than 40°.

9. A crosslinked polymer of claim 8 wherein said receding contact angle is less than 25°.

10. A crosslinked polymer of claim 9 wherein said receding contact angle is less than 15°.

11. A crosslinked polymer of claim 10 wherein said receding contact angle is less than 10°.

12. A crosslinked polymer of claim 1 wherein said unit of formula I is at least 20% halogen free.

13. A crosslinked polymer of claim 12 wherein said unit of formula I is at least 25% halogen free.

14. A crosslinked polymer of claim 13 wherein said unit of formula I is at least 30% halogen free.

15. A crosslinked polymer of claim 14 wherein said unit of formula I is at least 40% halogen free.

16. A crosslinked polymer of claim 15 wherein said unit of formula I is substantially halogen free.

17. A crosslinked polymer of claim 1 wherein said Dk is at least 2.5 times that of poly(2-hydroxyethyl) methacrylate.

18. A crosslinked polymer of claim 17 wherein said Dk is greater than 3 times that of polyhydroxyethylmethacrylate.

19. A crosslinked polymer of claim 18 wherein said Dk is greater than 40.

20. A crosslinked polymer of claim 1 wherein each of b, d, and f is 0 or 1.

21. A crosslinked polymer of claim 20 wherein $R_1$–$R_{18}$ are independently hydrogen, methyl, or a crosslinkable moiety.

22. A crosslinked polymer of claim 1 which comprises the polymerization product of a monomer of formula V $$L'\text{-}D\text{-}[A\text{-}L\text{-}D]_w\text{-}A\text{-}L'' \qquad (V)$$

wherein

A is a unit of formula I as defined in claim 1, with the proviso that all A groups are not homopolymers of poly(propylene glycol) or of poly(tetramethylene glycol);

D is —O— or —N($R_{19}$)— where $R_{19}$ is hydrogen, $C_1$-$C_4$alkyl or phenyl;

w is zero to 8;

each L is independently —B-R-B′—, —B-R— or —R-B′— wherein R is independently selected from groups i), ii), iii) and iv) used to define δ in claim 1; and each of B and B′ is independently —CO—, —COO— or —CONH— where the recited carbonyl group is bound directly to D or A;

L′ is selected from hydrogen, P′-R-B′— or P′—B-R-B′— where P′ is hydrogen, amino, hydroxy or a moiety capable of being bound to a carbonyl group and further containing a group capable of undergoing crosslinking when coreacted with a crosslinking agent or when irradiated by actinic radiation and the carbonyl of B is bound to P′ when B is present; and L″ is selected from hydrogen, a terminal monovalent aliphatic, aromatic or cycloaliphatic group of up to 14 carbon atoms, —B-R-P′ or —B-R-B′—P′ wherein the carbonyl group of B′ is bound to P′ when B′ is present.

23. A crosslinked polymer of claim 1 wherein at least a portion of said hydrophilic modifier provides at least a portion of said crosslinks.

24. A crosslinked polymer of claim 1 wherein said hydrophilic modifier is bound to one or more of $R_1$–$R_{18}$.

25. A crosslinked polymer of claim 22 wherein P′ contains an ethylenically unsaturated group.

26. A crosslinked polymer of claim 25 wherein said $R_{21}$ is an ethylenically unsaturated radical.

27. A crosslinked polymer of claim 1 wherein said hydrophilic modifier unit is a residue of a reactive monomer of formula C wherein $R_{21}$ is an ethylenically unsaturated group selected from a)

$$H_2C=\overset{R_{23}}{\underset{|}{C}}-$$

and the terminus of δ to which it is bound is —C(O)$R_{24}$— with the carbonyl being bound to $R_{21}$, where $R_{23}$ is H or methyl and $R_{24}$ is —O—, —N$R_{25}$— with $R_{25}$ being lower alkyl;

b) $H_2C=CH$— and the terminus of δ to which it is bound is

<img phenyl-R_{26}- > with the left hand bond being bound to $R_{21}$ wherein $R_{26}$ is —O—, —N$R_{25}$—, NHCCOO— lower alkylene —C(O)—, or —C(O)O—; and c)

$$H_2C=\overset{R_{29}}{\underset{|}{C}}-$$

and the terminus of δ to which it is bound is —C(O)$R_{28}$—, the carbonyl of which is bound to $R_{21}$, wherein $R_{28}$ is lower alkylene or —[CH$_2$CH(lower alkyl)O]1-5 and $R_{29}$ is H, lower alkyl, or —CN; and H′ is selected from a) morpholino which is unsubstituted or mono-tetra substituted by lower alkyl;

(b)

$$-N\diagdown\diagup, \quad -N\diagdown\diagup, \quad -N\diagdown\diagup$$
$$\parallel \qquad \parallel \qquad \parallel$$
$$O \qquad O \qquad O$$

unsubstituted or substituted by lower alkyl;

(c)
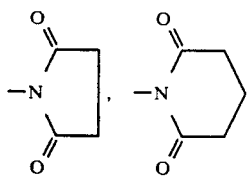

unsubstituted or substituted by lower alkyl;

(d)
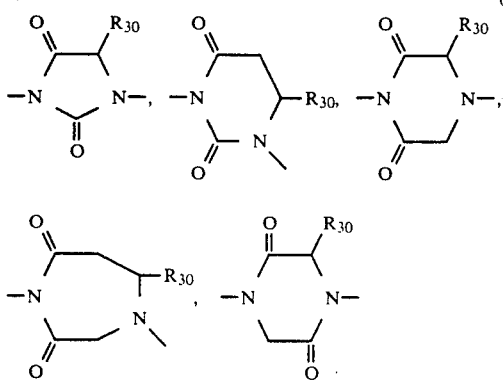

wherein $R_{30}$ is H or

—COH (with C=O)

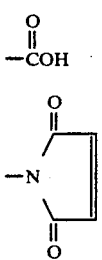

-continued

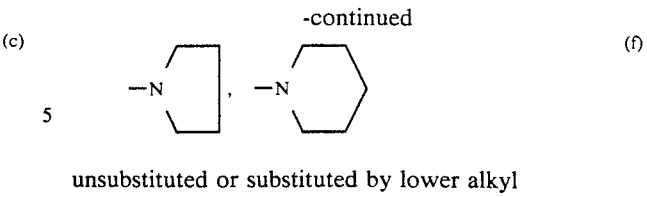

unsubstituted or substituted by lower alkyl (g)
—N⟨ring⟩—(CH$_2$)$_{0-5}$OH h) a polyolyl selected from polyvinyl alcohol, $$[-O-CH_2-(CH)_x-CH_2O\}_yH_y$$
(with OH on CH)

x=2–10, y=(0.5x) to (x41) di-tetra saccharides thereof and the cyclic analogs thereof, i) $C(CH_2O)_4H_{ya}$, ya=0—3 and j) poly hydroxylower alkylene glycols absent one up to 50% of the alcoholic hydrogens otherwise present.

28. A crosslinked polymer of claim 27 wherein the monomer of formula C is

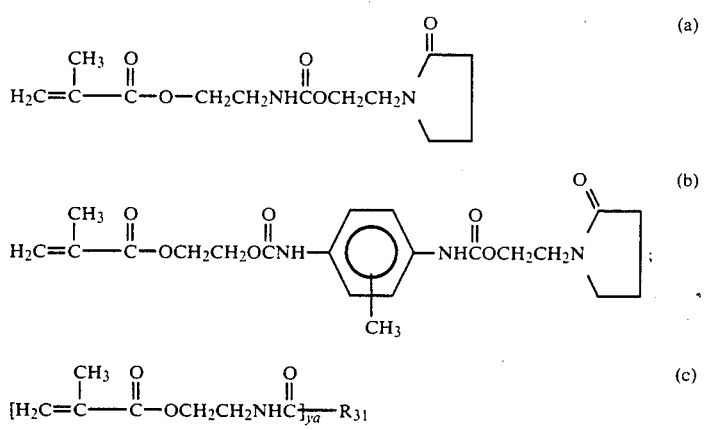

wherein $R_{31}$ is $$—[OCH_2(—CH—)_{xa}CH_2O]—H_{yb}$$
(with O/OH on CH)

and xa is 1 up to 6, yb is 0 up to xa+1 and ya is 1 up to xa+2—yb d) $[H_2C=C—C—OCH_2CH_2NHC]_{yc}R_{32}$ wherein $R_{32}$ is $C(CH_2O)_4H_{4-yc}$ and yc is 1-4;

e) polyvinyl alcohol having at least one alcoholic hydrogen up to 50% of the alcoholic hydrogen atoms absent; or (e)
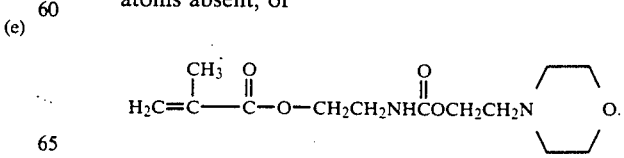

* * * * *